United States Patent [19]

Ja

[11] Patent Number: 5,973,851
[45] Date of Patent: Oct. 26, 1999

[54] OPTICAL AIR-PATH ISOLATOR USING A BEAM APERTURE METHOD

[75] Inventor: Yu Hong Ja, San Jose, Calif.

[73] Assignee: Ja Laboratories, Inc., San Jose, Calif.

[21] Appl. No.: 09/088,084

[22] Filed: Jun. 1, 1998

[51] Int. Cl.$^6$ .............................. G02B 3/00; G02B 9/00; G02B 6/26; G02B 6/32

[52] U.S. Cl. ......................... 359/654; 359/738; 359/737; 359/652; 372/703; 385/31; 385/33; 385/35

[58] Field of Search ..................................... 359/652, 653, 359/654, 737, 738; 372/703; 385/31, 33, 34

[56] References Cited

U.S. PATENT DOCUMENTS

| | | | |
|---|---|---|---|
| 3,827,785 | 8/1974 | Matsushita et al. | 372/703 |
| 5,317,655 | 5/1994 | Pan | 385/11 |
| 5,825,950 | 10/1998 | Cheng | 385/27 |
| 5,850,493 | 12/1998 | Cheng | 385/34 |

*Primary Examiner*—Georgia Epps
*Assistant Examiner*—David N. Spector

[57] ABSTRACT

This invention proposes the fabrication of a polarization-independent air-path isolator based on a beam aperture method. The isolator includes a micro Grin lens (MGL) and three small Grin lenses (SGLs). These lenses focus and collimate the forward and backward beams from the input and output ends of the isolator. In addition, one of the small Grin lenses (SGLs) also acts as a beam expander for the backward beam. Due to the significant difference in widths between the forward and backward collimated beams, the optical power of the forward beam is almost completely collected by the output small Grin lens (SGL) at the output end, while only a very small percentage of the optical power of the backward beam is collected by the small Grin lens (SGL) at the input end. Since a laser beam, in general, has a Gaussian beam-intensity distribution, positioning the micro Grin lens (MGL) at an off axis position will significantly enhance the isolation characteristic of the isolator. Two-stage isolators whose basic structure includes two tandem single-stage isolators can also significantly enhance the isolation property of the isolator.

24 Claims, 8 Drawing Sheets

OPTICAL AIR-PATH ISOLATOR USING A BEAM APERTURE METHOD

CROSS-REFERENCE TO RELATED APPLICATIONS

This application relates to the following copending U.S. patent applications by the same applicant as the present application: Ser. No. 09/084,295, filed on May 26, 1998, and titled "Optical Isolator Using a Beam Aperture Method"; Ser. No. 09/086,221, filed on May 28, 1998, and titled "Optical Filter-Isolator Using the Beam Aperture Method"; and Ser. No. 09/086,230, filed on May 28, 1998, and titled "Optical Circulator Using the Offset Beam Aperture Method."

BACKGROUND OF THE INVENTION

1. Field of the Invention

This invention relates in general to optical components, and in particular to a polarization-independent air-path (free-space) isolator utilizing a beam aperture and/or an offset beam aperture method.

2. Description of Related Art

Optical air-path isolators are one of the most important passive components to be used in laboratories, testing and related technologies. The function of an optical isolater is to allow a light beam to pass through it in one direction, for example, the foward direction only (like a one-way traffic). The isolator dramatically suppresses the light propagating in the backward direction.

The current polarization-independent air-path (free-space) isolator is based on the Faraday effect, which is one of the most commonly used nonreciprocal effects. A stage of the art air-path (free-space) isolator basically consists of a Faraday single crystal (for example, Garnet), a hollow magnet and two birefringent crystals (for example, $LiNbO_3$). The Faraday crystal is placed inside the hollow magnet and between these two birefringent crystals. Collimated or nearly-collimated beams propagating through the air are usually required as the incident beams for the isolator. That is why the isolator is called an air-path or free space one.

The forward-going beam from the input side, upon impinging on the first birefringent crystal, becomes two spatially separated beams (the ordinary and extraordinary beams with orthogonal polarization vectors, that is, the O-beam and the E-beam) due to the birefringence. After passing the Faraday crystal and the second birefringent crystal, these two beams are paralleled to each other and therefore completely get through the small aperture at the output end. However, the O-beam and the E-beam of the backward-going beam emerging from the first birefringent crystal, become divergent due to the nonreciprocal Faraday effect. The divergent beam cannot pass through the small aperture at the input end. Thus, the function of an isolator (to suppress the backward-going beam) is realized. The structure of such an isolator is quite complicated, and accurate optical alignments between these parts are required. The high cost of the components and labors leads to a relatively expensive air-path isolator.

There is therefore an urgent need for another type of air-path isolator that significantly reduces the number of components, resulting in a simpler structure, a faster assembly time, lower cost, higher reliability and improved performance.

BRIEF SUMMARY OF THE INVENTION

This invention presents a new type of polarization-independent air-path isolator based on a beam aperture method, as explained in a patent application entitled "Optical Isolater Using a Beam Aperture Method", Ser. No. 09/084,295, filed on May 26, 1998. The main parts of a basic air-path isolator include three small Grin lenses or SGLs (L1, L2, L3, with a diameter of 2–8 millimeters) and a micro Grin lens or MGL (L4, with a very small diameter, say 30 to 150 micrometers). The two SGLs (L1, L3) at the input end and the output end of the isolator are used to focus the forward and the backward collimated beams. MGL (L4) collimates the forward beam. SGL (L2) is positioned at the middle of the isolator and is also used to focus the forward beam toward SGL (L3) at the isolator output end. Because the length of MGL (L4) is much smaller than that of the SGL (L2), the width (also referred to herein as aperture) of the collimated forward beam is much smaller than that of the collimated backward beam. Thus, the forward beam will almost completely pass the isolator, whereas only a very small percentage of the optical power of the backward beam is collected by MGL (L4) and SGL (L1) positioned at the input end. Compared with a conventional air-path isolator using the Faraday effect, the present isolator has fewer, simpler and cheaper components, which leads to a simpler structure, faster assembly time, lower overall cost, higher reliability and improved performance characteristics.

BRIEF DESCRIPTION OF THE DRAWINGS

The features of the present invention and the manner of attaining them will be apparent. The invention will be understood by reference to the following description and the accompanying drawings, wherein.

Similar numerals refer to similar elements in the drawings (FIG. 1–FIG. 4). Note that the drawings are not to scale and components in the figures are not in exact proportion. This is for easy explanation and visual clarity.

DETAILED DESCRIPTION OF THE INVENTION

Figure 1:
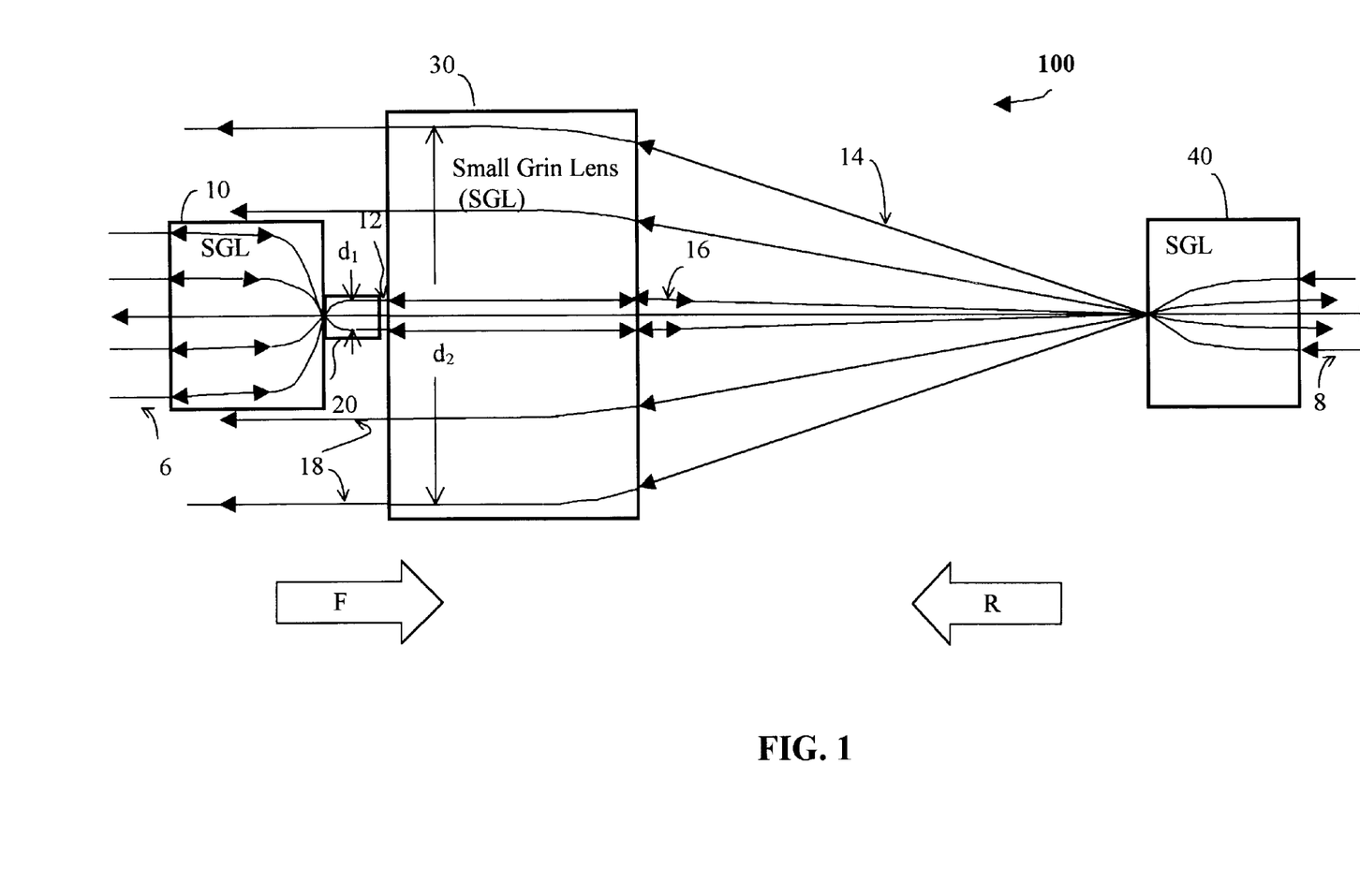
FIG. 1 is a schematic side view of an air-path isolator according to the present invention, showing all the lenses L1, L2, L3, and L4 positioned along an isolator axis (on-axis position)

Because Grin lenses are the key components of an air-path isolator, we first describe their basic properties. A Grin lens is a cylinder of dielectric material whose refractive index usually decreases in the radial direction (The refractive index reaches a maximum at the cylinder axis. In FIG. 1, the radial direction of the Grin lens is the vertical direction). The radial distribution of its refractive index is expressed as $$n(r) = n_0(1 - Ar^2/2), \qquad (1)$$

where $n_0$ is the maximum refractive index (at r=0, that is, at the axis), $A^{1/2}$ is the gradient constant and r is the radius of the Grin lens. A Grin lens with this refractive profile is similar to a conventional convex lens. A Grin lens has the following advantages over a conventional convex or concave lens:

1) Low aberrations.
2) High focusing effect.
3) Convenience of mounting and alignment.

Due to these advantages, Grin lenses have replaced conventional lenses in the manufacture of most fiber optic components such as in-line isolators and circulators, and of some general optic components.

FIG. 1 is the schematic side view of a polarization-independent air-path isolator 100 according to the present invention. The isolator 100 comprises a MGL (L4) 20, three SGLs (L1) 10,(L2) 30,(L3) 40. The pitch of the MGL 20 and the SGLs (L1) 10, (L3) 40 is equal to 0.25, while that of the SGL (L4) is equal to 0.11. The pitch P is equal to $2\pi/A^{1/2}$, twice the distance between two adjacent beam focuses inside the Grin lens, where $A^{1/2}$ is the gradient constant of the Grin lens. The (physical) length of the Grin lens is equal to $2\pi P/A^{1/2}$.

The collimated forward beam 6 (from the left side) is focused by the SGL (L1) 10 into a point at the center of its output surface, and becomes collimated again due to the MGL (L4) 20. This beam is then focused by the SGL (L2) 30 into a point at the center of the input surface of the SGL (L3) 40, and finally becomes collimated (beam 8) due to the SGL (L3) 40. The backward-going beam consisting of beam bundles 14 and 16 undergoes a similar procedure as the forward-going beam. The length of the MGL (L4) 20 is much smaller than that of the SGL (L3) 30. This means that the gradient constant $A^{1/2}$ of the MGL (L4) 20 is much larger than that of the SGL (L2) 30. Consequently, the beam width d1 of a colliimated forward beam 12 at the output of MGL (L4) 20, and the beam width d2 of a colliimated backward beam 18 at the output of SGL (L2) 30 are significantly different, that is the beam width d2 is much greater than the beam width d1. The forward beam 12 (or 16) will be intercepted almost completely by SGL (L3) 40 at the output end of the isolator 100, whereas only a very small percentage of the optical power of the collimated backward beam 18 is collected by the MGL (L4) 20.

Figure 2:
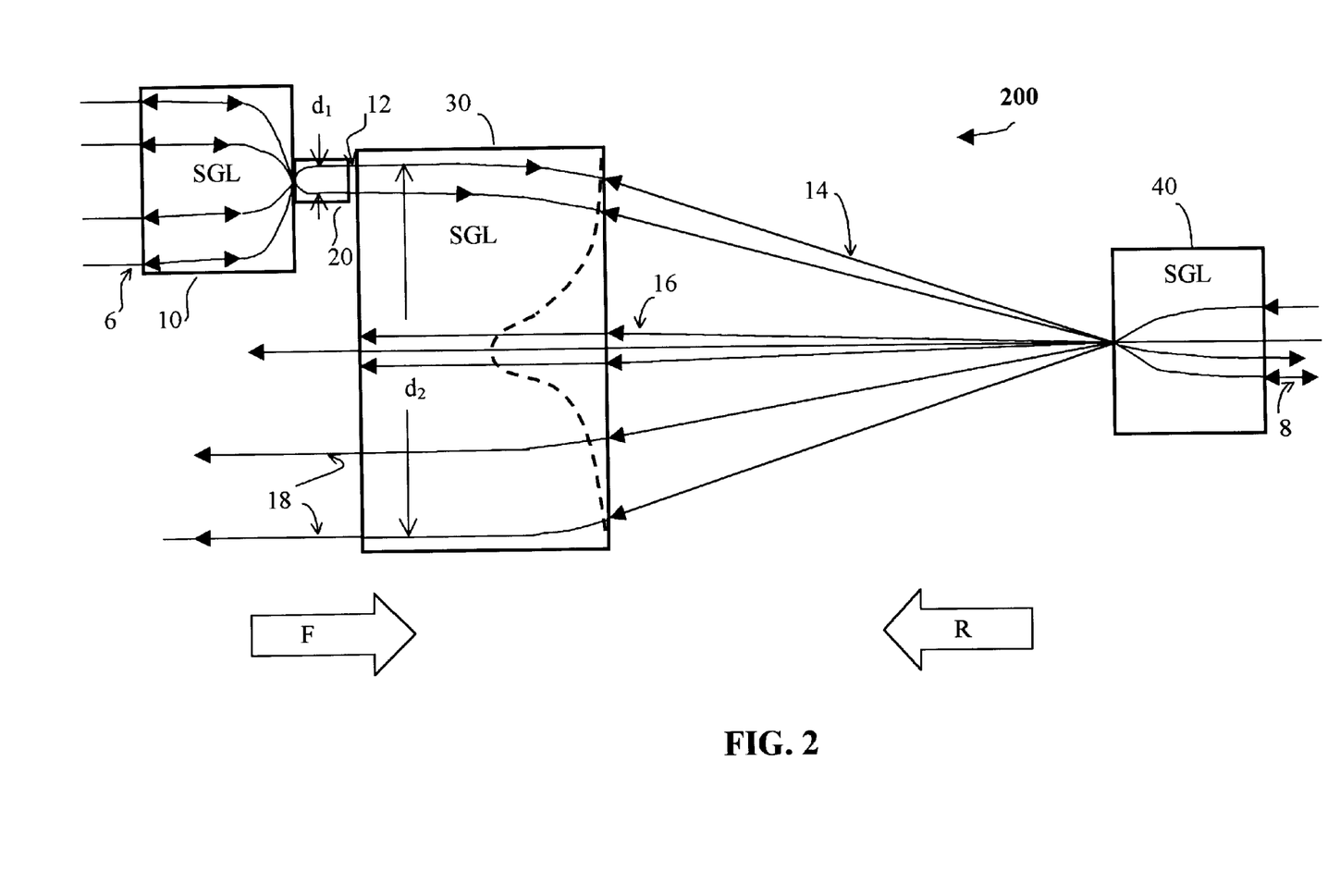
FIG. 2 is a schematic side view of the isolator of FIG. 1, depicting a SGL (L1) and a MGL (L4) at the isolator input end along in an off-axis position, and further illustrating a beam-intensity distribution of the backward (or rearward) beam over the aperture of a SGL (L2)

The isolation (or backward loss) of the air-path isolator 100 is given by $$\text{Iso} = 10\log_{10}(P_2/P_1) = 10\log_{10}[K(d_2/d_1)^2], \qquad (2)$$

where $P_1$ is the total power of the collimated backward beam 18, and $P_2$ represents the power intercepted by the MGL (L4) 20 and, as described earlier, d1 and d2 are the diameters (beam widths or apertures) of the two collimated beams 12 and 18 (or approximately the diameters of the MGL (L4) 20 and the SGL (L2) 30), respectively. The constant K=1 if the beam-intensity distribution in the radial direction is uniform. For a Gaussian beam-intensity distribution, K<1 with an on-axis MGL (L4) 20 (FIG. 1), and K>1 with an off-axis MGL (L4) 20 (FIG. 2). The isolation is in the unit of dB. One can see from FIG. 1 or FIG. 2 that to have an effective isolation, the diameter $d_2$ of the backward beam 18 must be very much larger than the diameter $d_1$ of the forward beam 12. With a uniform beam, $d_2$=8 mm and $d_1$=0.15 mm, the isolation will be 34.5 dB. In FIG. 1, the arrow F represents the allowed propagating foward direction of the isolater 100, and arrow R represents the backward or rearward direction.

Another 200, is depicted schematically in FIG. 2. Since the backward beam (the collimated beam 18 or the beam bundles consisting of 14 and 16 in FIG. 2) emanating from the SGL (L3) 40 is essentially a Gaussian beam (see the broken curve shown in FIG. 2), placing the MGL (L4) 20 in an off-axis position (FIG. FIG. 2) will significantly enhance the isolation. In the off-axis position, the MGL (L4) 20 receives a smaller percentage of the collimated beam 18 than that in an on-axis position (FIG. 1). Depending on the offset of the MGL (L4) 20 and the real spatial intensity-distribution of the collimated backward beam 18 which depends in turn on the waist of the Gaussian beam and the distance between the SGLs 30 and 40, the isolation can increase by 3–15 dB (K>1 in Equation 2). For example, assuming the MGL (L4) 20 is placed at the position (near the edge of the SGL (L2) 30) where the intensity of the output Gaussian beam drops by a factor $1/e^2 \approx 0.135$ from its peak value on the beam axis, then $K \approx e^2 = 7.389$ and the isolation will be 43 dB. It should be pointed out that the width of the Gaussian beam is slightly different at the input and output surfaces of the SGL (L2) 30, due to the bending of the beam by the same lens and the non-zero lens length.

In practice, a Grin lens with a larger diameter can replace the MGL (L4) 20 shown in FIGS. 1 and 2. This will make the fabrication of an isolator easier and may strengthen the isolator's mechanical structure. However, in this case, the length of this Grin lens should be much smaller than that of the SGL (L2) 30. In addition, the outer area of the output surface of this Grin lens should be deposited with a light-difflusing layer to prevent the backward beam 18 from being reflected back to the SGL (L3) 40.

Figure 3:
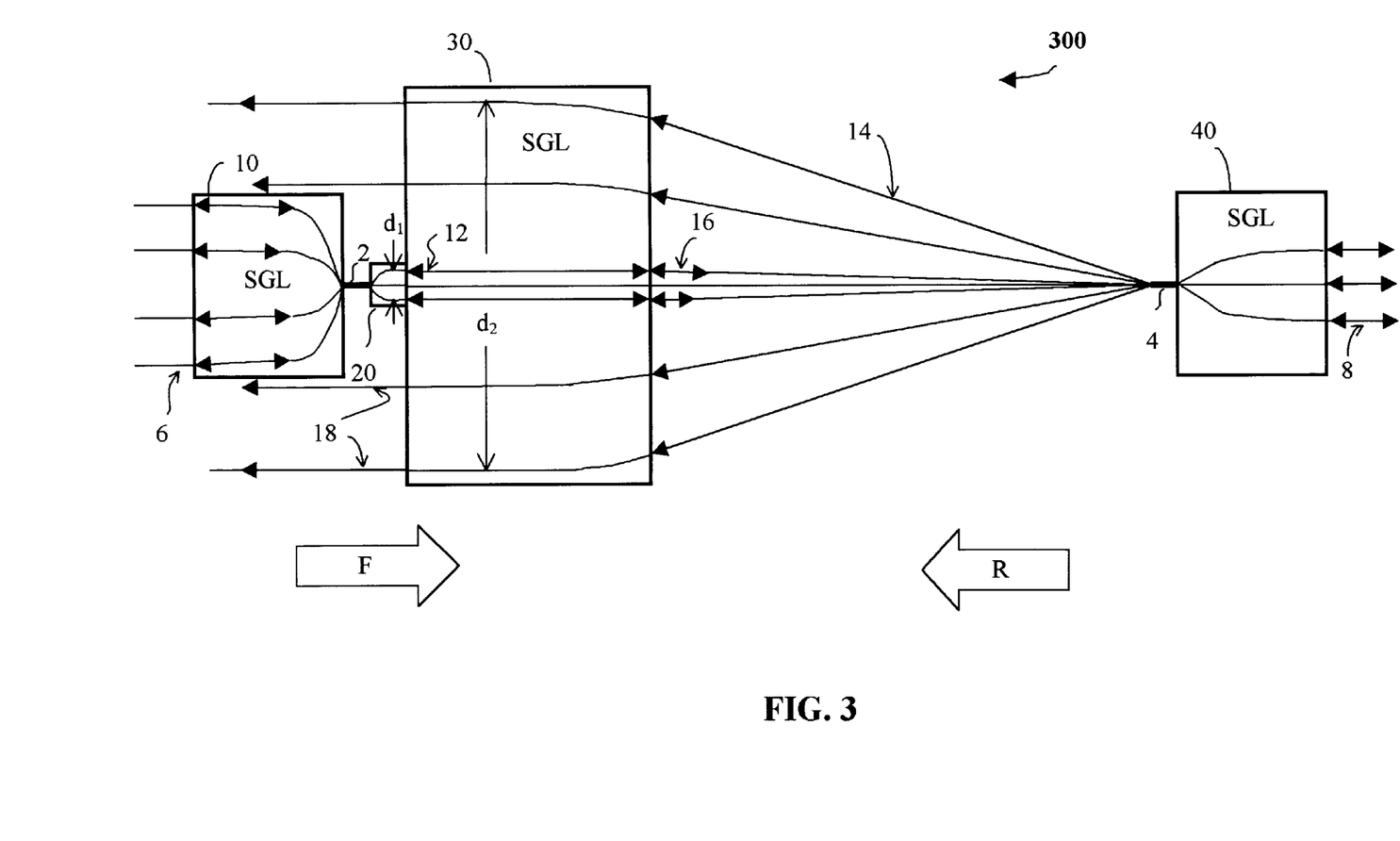
FIGS. 3 and 4 are schematic side views of other air-path isolators according to the present invention, shown using two short segments of single mode fibers, with all the components disposed in an on-axis position (FIG. 3), and SGL (L1), the first fiber and MGL (L4) disposed in an off-axis position (FIG. 4)
Figure 4:
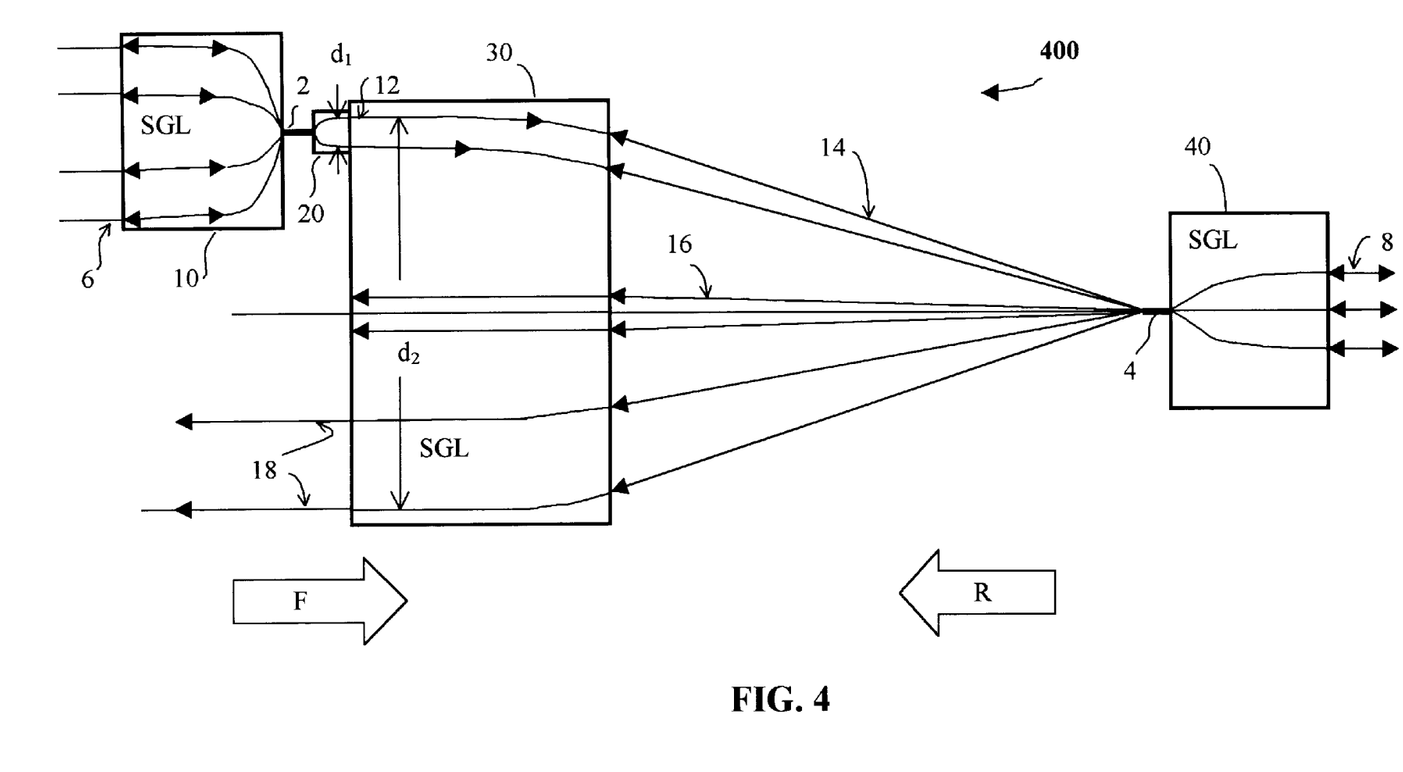
Figure 5:
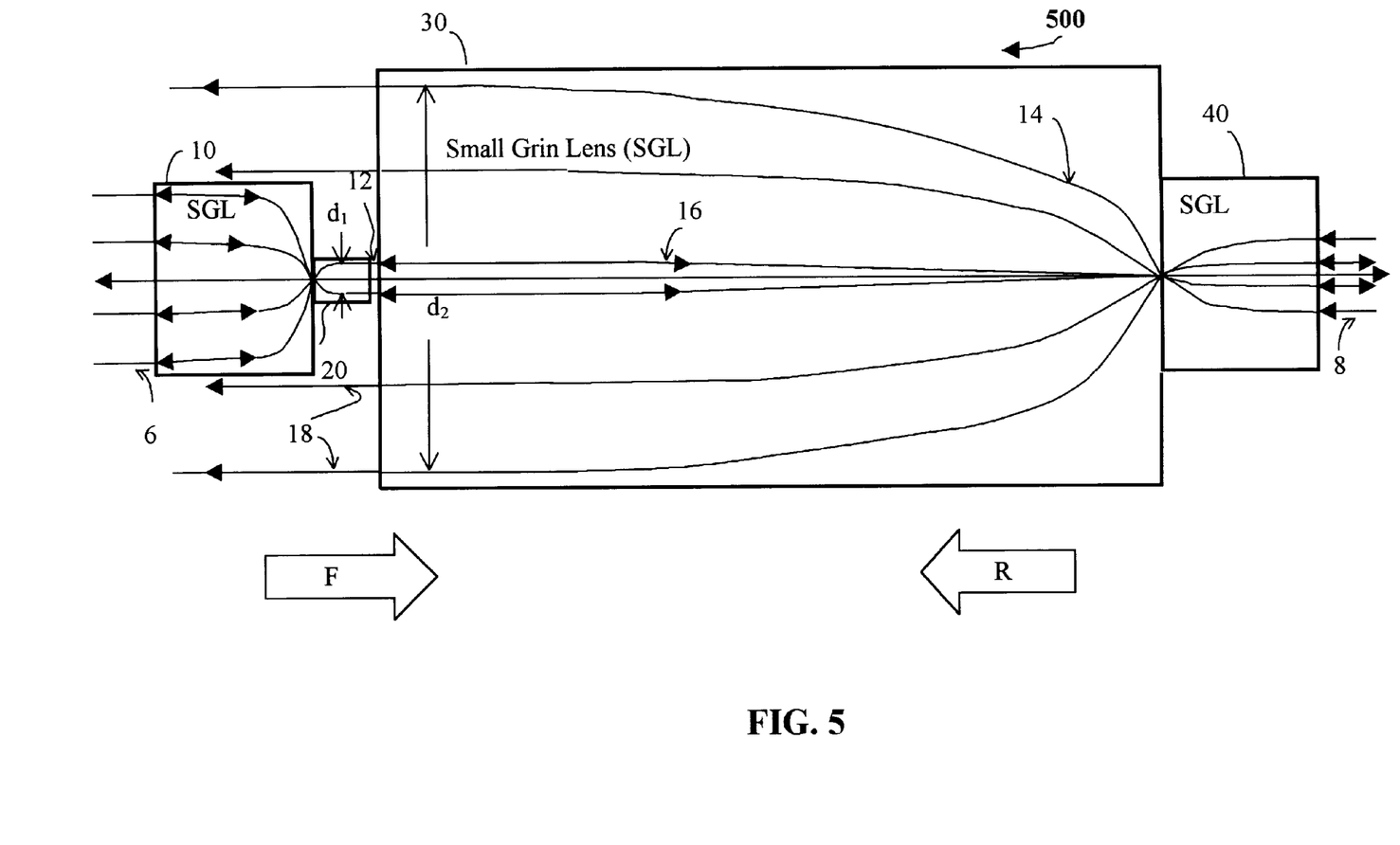
FIG. 5 is a schematic side view of an air-path isolator according to another embodiment of the present invention, showing a SGL (L2) with a pitch of 0.25, and all the components of the isolator in an on-axis position.
Figure 6:
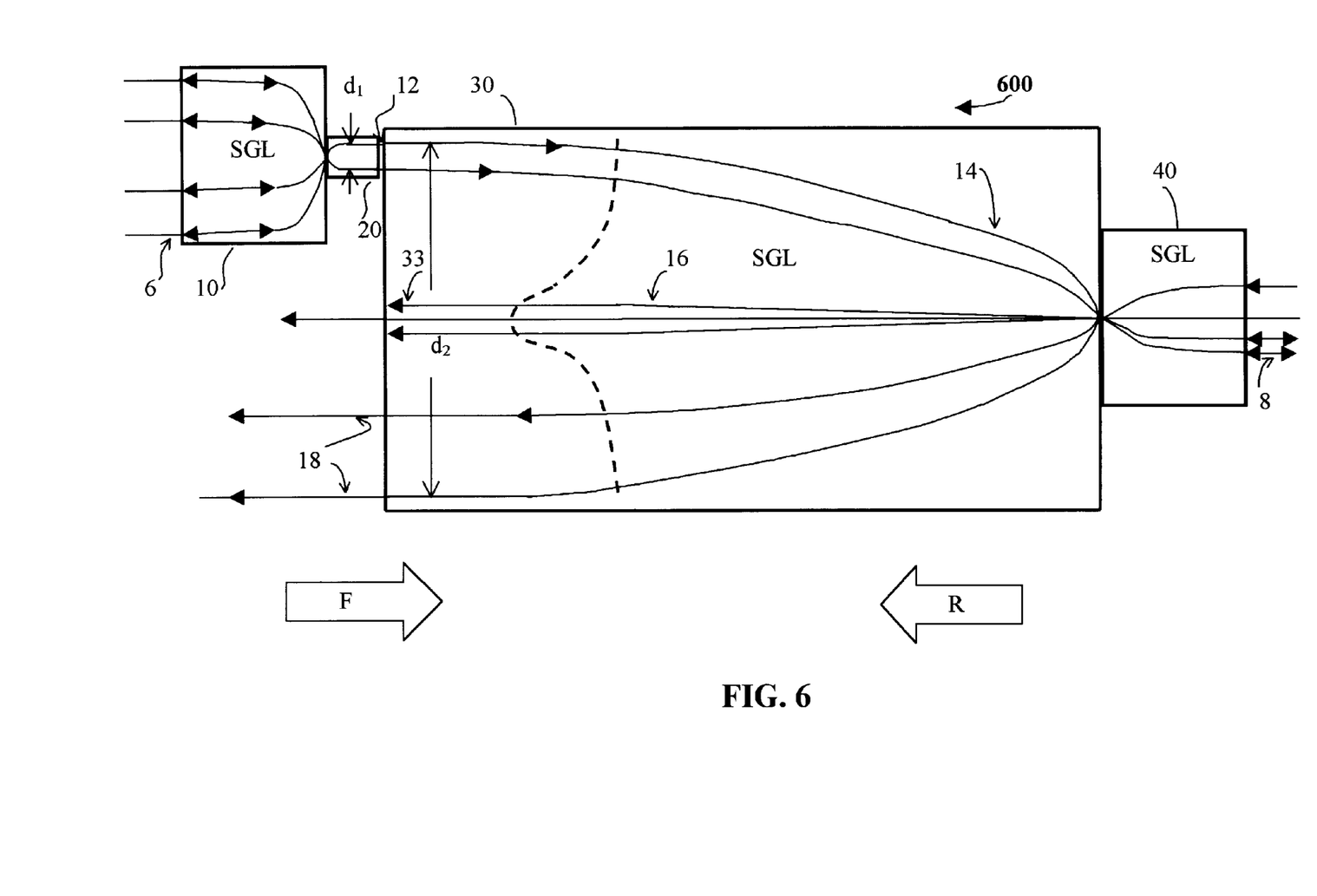
FIG. 6 is a schematic side view of an air-path isolator according to another embodiment of the present invention, showing a SGL (L2) with a pitch of 0.25, and the SGL (L1) and the MGL (L4) positioned at the input end of the isolator, in an off-axis position, and depicting the beam-intensity distribution of the rearward beam over the aperture of SGL2.
Figure 7:
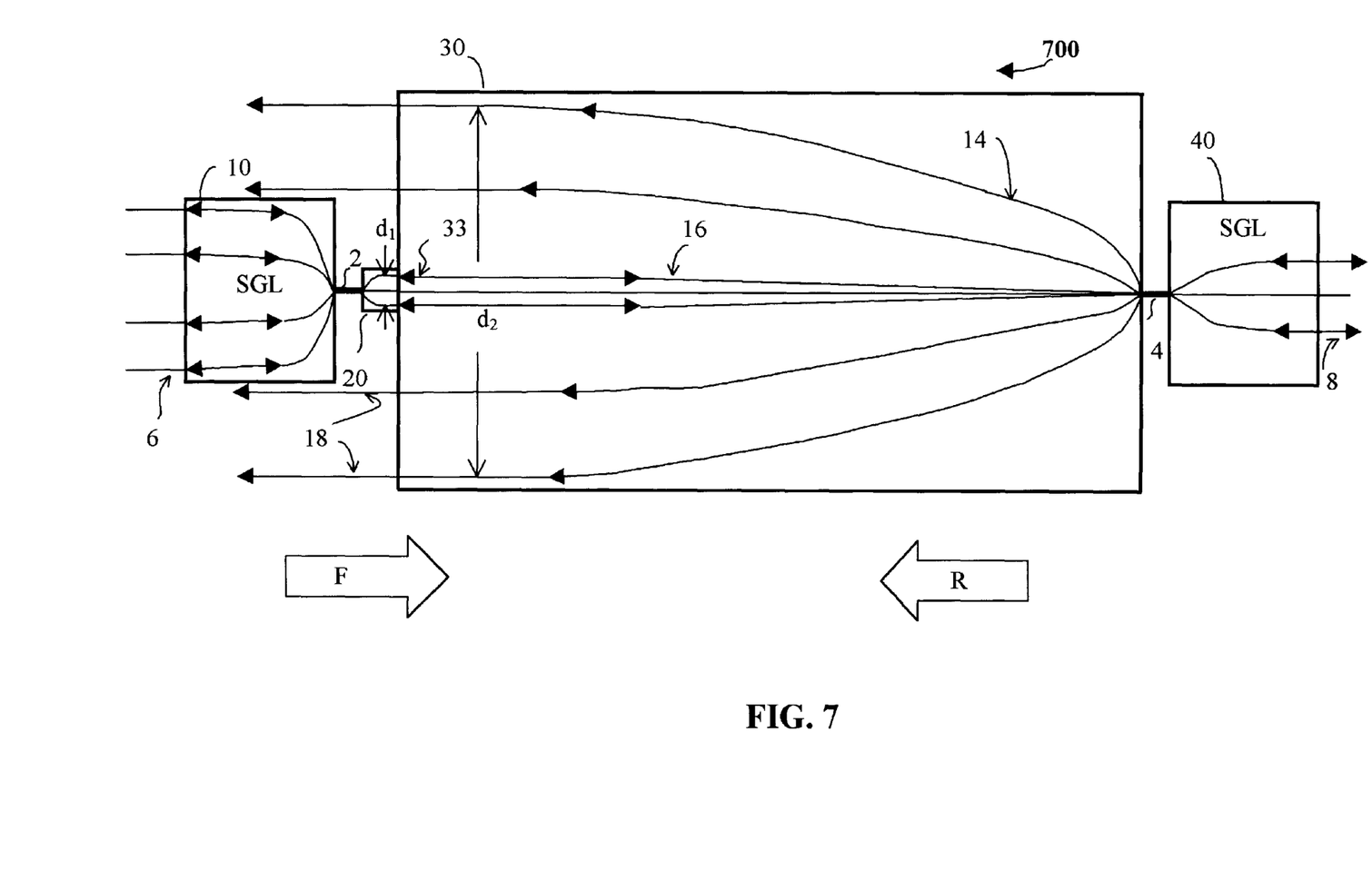
FIGS. 7 and 8 are schematic side views of air-path isolators according to two other embodiments of the present invention, shown using two segments of single mode fibers, with all the components disposed in an on-axis position (FIG. 7), and SGL (L1), the first fiber and MGL (L4) disposed in an off-axis position (FIG. 8).
Figure 8:
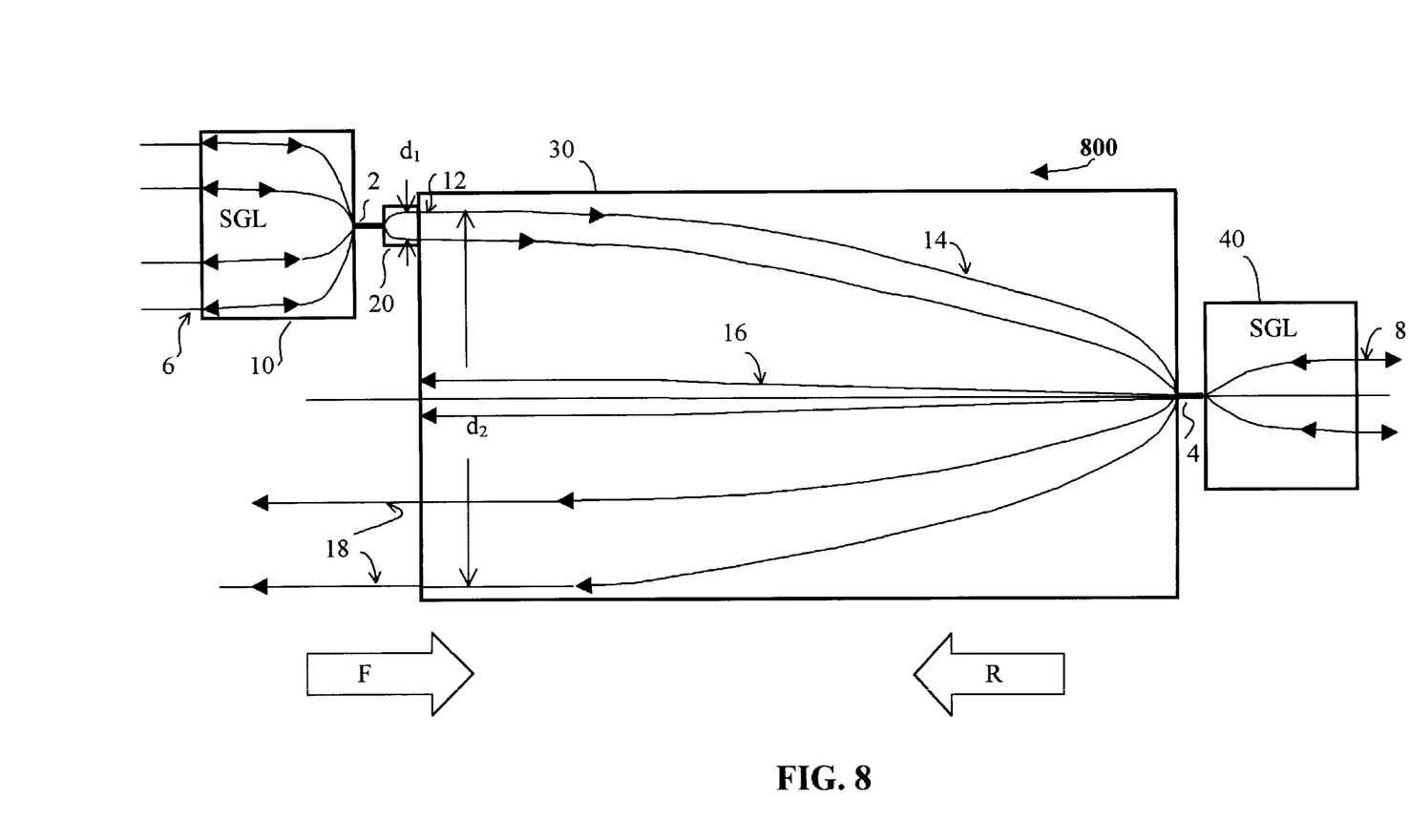

The disadvantage of the isolators shown in FIGS. 1 and 2 is that its isolation may depend on the beam width of the backward and forward beams. FIGS. 3 and 4 are the schematic side views of improved air-path isolators 300 and 400, respectively where two short segments of single mode fibers are added. The isolation of air-path isolators 300 and 400 is basically independent of the beam width of input and output beams. The optical design of the isolators shown in FIGS. 1–4 should guarantee the same width for the collimated input and output beams 6 and 8. Two-stage air-path isolators whose basic structure consists of two tandem single-stage air-path isolators can be constructed. The two-stage air-path isolator has much higher isolation.

In FIGS. 3 and 4, the fiber 2 is placed between the SGL (L1) 10 and the MGL (L4) 20 , while the fiber 4 is placed between the SGL (L2) 30 and the SGL (L3) 40. The operating principle of isolators 300 and 400 is the same as that of isolators 100 and 200. Here fibers 2 and 4 are used to confine the light beams in the areas of their small cores of 9–12 $\mu$m. Thus, beams emanating from these two fibers have the half angles equal to the fiber's numerical apertures. In consequence, the beam diameters $d_1$ and $d_2$ do not depend on the beam widths of the input and output beams. Multiple mode fibers can be used in stead of the single mode fibers 2 and 4 shown in FIGS. 3-4. The multiple mode fiber has a larger core (with a diameter of 25 to 200 micrometers) than that of a single mode fiber.

The SGL (L2) 30 (0.11 pitch) shown in FIGS. 1–4 can be replaced with a lens having a pitch equal to 0.25. Then the SGL (L3) 40 should be attached to the SGL (L2) 30. These a increase the mechanical strength of the isolator. However, the length of the isolator may be longer. Using a plano-concave SGL (L2) 30 and/or plano-convex SGL (L1) 10 and SGL (L3) 40 shown in FIGS. 1–4 and/or single mode fibers with a larger numerical aperture as the input and output fibers 2 and4, the overall length of an isolator can be reduced.

In fabricating this type of isolators, only a very small area (around 0.13 mm$^2$ or less) of one surface of the SGLs (L2) 10 and SGL (L3) 40 and of the input and output surfaces of the SGL (L2) 30 in which the forward-going beam propagates needs to be polished and/or coated with anti-reflection players. Of course, the whole out-most surfaces (facing the input or output beams) of the SGL (L1) 10 and 40 should be polished and/or coated with anti-reflection players to reduce the insertion loss of the isolator.

The components of the isolators 100–400 shown in FIGS. 1–4 are all in the form of a cylinder. And the structures of the isolators are simple. It is unnecessary to show the cross-sectional view, since they all have a circular cross section.

The following Table 1 summarizes exemplary key parameters of the preferred embodiments:

TABLE 1

| Parameter/Lens | L1 | L2 | L3 | L4 |
|---|---|---|---|---|
| Pitch = P | 0.25 | 0.11 (0.25) | 0.25 | 0.25 |
| Gradient Constant = A$^{1/2}$ | 0.1–0.3 | 0.05–0.3 (0.05–0.3) | 0.1–0.3 | 1–3 |
| Length = $2\pi P/A^{1/2}$ (mm) | 15.7–5.2 | 13.8–23 (31.4–5.24) | 15.7–5.2 | 1.57–0.52 |
| Diameter d (mm) | 1–5 | 2–8 (2–8) | 1–5 | 0.03–0.15 |

Compared with the current air-path isolator, this type of air-path isolators has the following advantages:

1) A much simpler structure and uses only a few simple components (Grin lenses and fibers).
2) Lower overall cost, due to fewer parts, easier fabrication and a faster assembly time.
3) Higher reliability.
4) Broadband [say, 940–1020 nm (nanometer), 1500–1600 nm]. The region of the central wavelengths of the air-path isolators includes IR, visible light and UV (ultraviolet). An isolator at 980 nm with smaller dimensions than that of the current one can be made.
5) A lower insertion loss (about 0.4–0.5 dB for the isolators 100–200, and about 0.6–0.7 dB for the isolators 300–400).
6) Virtually polarization dependent loss (PDL) and polarization mode dispersion (PMD) free, because the input beam is not divided into two orthogonally polarized beams.

What I claim as my invention is:

1. An optical isolator having an input side and an output side, comprising:
   four graded index lenses L1, L2, L3, L4 disposed in a predetermined order along an optical axis from the input side to the output side;
   wherein three of said lenses L1, L2, L3 are small GRIN lenses, and one lens L4 is a micro GRIN lens.

2. An optical isolator having an input side and an output side, comprising:
   four graded index lenses L1, L2, L3, L4 disposed in a predetermined order from the input side to the output side;
   wherein three of said lenses L1, L2, L3 are small GRIN lenses, and one lens is a micro GRIN lens;
   wherein two of said small GRIN lenses L2, L3 are disposed along a first axis;
   wherein one of said small GRIN lenses L1 and said micro GRIN lens L4 are disposed along a second axis; and
   wherein said second axis is offset relative to said first axis.

3. An optical isolator having an input side and an output side, comprising:
   four graded index lenses L1, L2, L3, L4 disposed in a predetermined order along an optical axis from the input side to the output side:
   wherein three of said lenses L1, L2, L3 are small GRIN lenses and one lens L4 is a micro GRIN lens: and
   wherein one of said small GRIN lenses L1 is connected to said micro GRIN lens L4 by means of an optical fiber.

4. An optical isolator having an input side and an output side, comprising:
   four graded index lenses L1, L2, L3, L4 disposed in a predetermined order along an optical axis from the input side to the output side;
   wherein three of said lenses L1, L2, L3 are small GRIN lenses, and one lens L4 is a micro GRIN lens; and
   further including an optical fiber disposed along a path between two of said small GRIN lenses L2, L3.

5. An optical isolator having an input side and an output side, comprising:
   four graded index lenses L1, L2, L3, L4 disposed in a predetermined order along an optical axis from the input side to the output side;
   wherein said four graded index lenses L1, L2, L3, L4 are small GRIN lenses.

6. An optical isolator according to claim 1, wherein one of said small GRIN lenses L2 has a pitch of 0.25.

7. An optical isolator according to claim 5, wherein each of said small GRIN lens L1, L2, L3, L4 has a pitch of approximately 0.25.

8. An optical isolator according to claim 1, wherein one of said small GRIN lenses L1 is attached to said micro GRIN lens L4.

9. An optical isolator according to claim 4, wherein said small GRIN lens L2 has a pitch of approximately 0.25.

10. An optical isolator according to claim 9, wherein said micro GRIN lens L4 has a pitch of approximately 0.25.

11. An optical isolator according to claim 1, wherein at least part of said small GRIN lenses L1, L2, L3, and at least part of said micro GRIN lens L4 are coated with an anti-reflective layer.

12. An optical isolator according to claim 1, further including a small GRIN lens whose index of refraction increases along a radial direction, and which is positioned between two of said small GRIN lenses L2, L3.

13. An optical isolator according to claim 4, further including an optical fiber interconnecting one of said small GRIN lenses L1 and said micro GRIN lens L4.

14. An optical isolator according to claim 2, wherein one of said small GRIN lenses L2 has a pitch of 0.25.

15. An optical isolator according to claim 2, further including an optical fiber interconnecting two of said small GRIN lenses L2, L3.

16. An optical isolator according to claim 15, further including an optical fiber interconnecting one of said small GRIN lenses L1 and said micro GRIN lens L4.

17. An optical isolator having an input side and an output side, comprising:

four graded index lenses L1, L2, L3, L4 disposed in a predetermined order from the input side to the output side;

wherein said graded index lenses L1, L2, L3, L4 are small GRIN lenses;

wherein two of said small GRIN lenses L2, L3 are disposed along a first axis;

wherein two of said small GRIN lenses L1, L4 are disposed along a second axis; and wherein said second axis is offset relative to said first axis.

18. An optical isolator according to claim 17, further including a optical fiber disposed between two of said small GRIN lenses L2, L3.

19. An optical isolator according to claim 18, further including a optical fiber disposed between two of said small GRIN lenses L1, L4.

20. An optical isolator according to claim 1, wherein one of said small GRIN lenses L2 has a pitch of 0.11.

21. An optical isolator according to claim 3, wherein one of said small GRIN lenses L2 has a pitch of approximately 0.25; and further includes an optical fiber that interconnects two of said small GRIN lenses L2, L3.

22. An optical isolator according to claim 16, wherein one of said small GRIN lenses L2 has a pitch of approximately 0.25.

23. An optical isolator according to claim 4, wherein one of said small GRIN lenses L2 has a pitch of approximately 0.25.

24. An optical isolator according to claim 15, wherein one of said small GRIN lenses L2 has a pitch of approximately 0.25.

* * * * *